United States Patent
Derrien et al.

(10) Patent No.: US 8,383,979 B2
(45) Date of Patent: Feb. 26, 2013

(54) PART-HOLDING DEVICE IN A REPAIRING METHOD FOR A BLADE OF A MONOBLOC BLADED DISC IN A TURBO-MACHINE

(75) Inventors: Gérard Derrien, Houilles (FR); Stéphane Kerneis, Velizy (FR); Jacques François Le Saint, Garancieres (FR); Claude André Charles Pagnon, Vaux sur Mer (FR)

(73) Assignees: SNECMA, Paris (FR); SNECMA Services, Paris (FR)

( * ) Notice: Subject to any disclaimer, the term of this patent is extended or adjusted under 35 U.S.C. 154(b) by 1044 days.

(21) Appl. No.: 11/764,519

(22) Filed: Jun. 18, 2007

(65) Prior Publication Data

US 2008/0000947 A1  Jan. 3, 2008

(30) Foreign Application Priority Data

Jun. 19, 2006  (FR) ..................... 06 52537

(51) Int. Cl.
*B23K 26/00* (2006.01)
*B23P 17/04* (2006.01)
*B23P 6/00* (2006.01)

(52) U.S. Cl. .......... 219/121.64; 219/121.6; 219/121.63; 29/889; 29/889.1; 29/889.2

(58) Field of Classification Search ............. 228/44.3, 228/49.1; 29/889, 889.1, 889.2; 219/121.64, 219/121.63, 121.6
See application file for complete search history.

(56) References Cited

U.S. PATENT DOCUMENTS

| | | | | |
|---|---|---|---|---|
| 3,846,610 A | * | 11/1974 | Asselborn et al. | 219/61 |
| 4,482,118 A | * | 11/1984 | Hoffmann | 248/180.1 |
| 5,316,202 A | * | 5/1994 | Murray et al. | 228/5.5 |
| 5,383,593 A | * | 1/1995 | Lechervy et al. | 228/182 |
| 5,551,623 A | | 9/1996 | Collot et al. | |
| 6,106,233 A | | 8/2000 | Walker et al. | |
| 6,939,199 B2 | * | 9/2005 | Peng et al. | 451/5 |
| 2006/0193612 A1 | | 8/2006 | Bouet et al. | |
| 2007/0023485 A1 | | 2/2007 | Bouet et al. | |

FOREIGN PATENT DOCUMENTS

| | | |
|---|---|---|
| DE | 10 2004 056 142 A1 | 6/2006 |
| EP | 0 596 796 A1 | 5/1994 |
| EP | 0 669 183 A1 | 8/1995 |
| EP | 1 000 695 A2 | 5/2000 |
| GB | 278825 | 10/1927 |
| SU | 1488172 A1 | 6/1989 |

* cited by examiner

*Primary Examiner* — Henry Yuen
*Assistant Examiner* — Ayub Maye
(74) *Attorney, Agent, or Firm* — Oblon, Spivak, McClelland, Maier & Neustadt, L.L.P.

(57) ABSTRACT

A part-holding device in a method for repairing a blade of a monobloc bladed disc of a turbo-machine, through electron-beam welding of a patch onto the blade along a junction plane is disclosed. The device includes a disc supporting device which supports the disc and an adjustable holding device which holds the blade and the patch. The adjustable holding device includes a platen which supports the adjustable holding device, arranged such that the space located above the junction plane allows for an electron beam to pass. The relative positions of the blade and the patch are set using the adjustable holding device that is supported by the platen, while leaving some space allowing for an electron beam to pass. Such a device is simple and reliable.

15 Claims, 7 Drawing Sheets

PART-HOLDING DEVICE IN A REPAIRING METHOD FOR A BLADE OF A MONOBLOC BLADED DISC IN A TURBO-MACHINE

The present invention relates to a part-holding device in a repairing method for a blade of a monobloc bladed disc in a turbo-machine.

A turbo-jet comprises various rotors rotating about its axis. Such rotors could comprise a disc with a rim along which blades are fixed. Traditionally, blades are held with their foot in a housing adapted therefor. In order to meet the increasing performance requirements for motors, such rotors can at present be monoblocs. They are so-called monobloc bladed discs (DAM). In a DAM, the blades and the disc are integrally made. To this end, a forged blank is machined so as to form the disc, the blades extending radially at its circumference, the whole piece being a single piece or monobloc. It is also possible to weld some parts, the resulting DAM being a monobloc. The monobloc rotors have numerous advantages, including in terms of mass.

Because of the absorption by the motor of foreign matters, of the erosion related to dust or particles being driven by the gas vein flow, the blades could show damaged areas, in the form of wear or torn parts, being detrimental to the turbo-jet efficiency. Said areas are generally at the top, at the blade corners in the leading or trailing edge side, and in the leading or trailing edge. Repairing blades in a DAM is not easy, as it is not possible to disassemble them for repair.

Wearing or damage, if they cannot be repaired, results in the part in question being replaced. Now, in the case of a DAM, replacing a blade would lead to replacing the whole DAM.

A method for repairing blades is known from the U.S. Pat. No. 6,238,187. In such a method, a portion of the blade around the damaged area is cut, as a standardized portion in order to allow for the method to be reproduced, whatever the shape and the size of the damaged area, as long as it is located in the portion in question. A spare part, or what is commonly called "patch", using its English counterpart, is then welded to the blade. Such a patch is of larger dimensions than the removed blade portion and is then machined so as to implement the initial shape of the blade.

The U.S. Pat. No. 6,568,077 teaches the use, for the welding step of a patch of the above-mentioned method, of a electron-beam welding method, having the advantages of a high welding rate and its ability to be able to weld high thicknesses.

A problem then however appears for titanium alloy rotors, the so-called Ti17. Such an alloy is disclosed, for example, in the Applicant's patent application EP 1,340,832 relating to a product, such as a blade, made in such a material. This material is hard to be welded as, during the melting step thereof, there occurs some degassing resulting in microporosities or blowholes in the area being thermally affected (ZAT) by welding, resulting in a reduction of the mechanical features of the welded part. Such a reduction could raise up to 80% in mechanical behaviour. Such a reduction is not tolerable for aeronautical applications and occurs in the case of electron-beam welding. Moreover, for a Ti17 rotor, the techniques of the TIG type or of the micro-plasma type being traditionally and commonly used in the aeronautics industry do not allow to obtain acceptable results.

Moreover, recent blades have three-dimension complex shapes, their wall thickness being variable, and do not allow an easy use of an electron welding method that requires a very accurate parameter definition. Such parameters should be defined for each particular case being considered, any standardization being difficult to be implemented.

The Applicant has filed a French patent application, registered under number FR 05 08 151, providing a method for repairing a blade of a monobloc rotor, having an evolutional shape and a variable thickness, such a method comprising an electron-beam welding step.

The present invention being the subject of the present patent application relates to a method for repairing a blade of a turbo-machine monobloc bladed disc comprising at least one damaged area, through electron-beam welding of a patch using a electron-beam welding machine, comprising the steps of setting up the damaged area, of electron-beam welding the patch and adjusting through machining of the repaired area, characterized in that:
the setting up step comprises machining the damaged area so as to obtain a determined profile area to be repaired;
welding is carried out on a first sample member, corresponding to the blade, having said determined profile, with the welding machine, with the operating parameters thereof being predefined, of a second sample member, having the patch features, in order to obtain a so-called trial start sample;
the trial start sample quality is checked after welding, and, in so far as the sample quality meets the repair reception criteria,
the patch is welded onto the area to be repaired with the same electron- beam welding machine without changing the operating parameters thereof, and
the repaired area is adjusted through machining.

Such a method has the advantage of allowing the industrialization of the repair of monobloc bladed discs, based on the piloting capacity of the electro-beam welding machines. Once the machine is validated and the parameters well defined, the only requirement is to check, through the preliminary welding operation of the second sample member, corresponding to the patch, on the first sample member, having the blade profile, that the parameters are correct and have not changed. It has been surprisingly shown that such a method allowed, quite reliably, for such complex parts as DAMs to be repaired. The preliminary check is enough for allowing for a plurality of blades to be repaired on the same disc.

Implementing such a method involves using a part-holding device allowing a good control of the relative positions of such parts. Indeed, if such a method allows to implement a research, and then to fix the welding specific parameters, the method also requires a guarantee as for the other parameters, such as the assembling sets, the mutual relative position of the members to be assembled, and the holding of such members during the method progress. Typically, a maximum play of 0.1 mm between parts is tolerated and is to remain constant throughout the whole method.

The present invention aims at providing such a holding-part device, wherein an adjustment of the part position, their attachment and their holding throughout the whole method are provided with a true reliability.

To this end, the present invention relates to a part-holding method in a method for repairing a blade for a turbo-machine monobloc bladed disc, through electron-beam welding of a patch onto the blade along a junction plane, the device comprising means for supporting the disc and adjustable means for holding the blade and the patch, the latter comprising a platen supporting part-holding means and patch-holding means, being arranged so that the space located on top of the junction plane allows for an electron beam to pass.

Through the invention, the relative positions of the blade and the patch are set with holding means that are all supported by a same platen, while leaving some space allowing for an electron beam to pass. Such a device is therefore simple and reliable.

According to an embodiment, the method involving the use of heels, the device further comprises adjustable heel-holding means.

Advantageously, the holding means are manually adjustable.

According to an embodiment, the disc-supporting means comprise a mandrel onto which the disc is fitted.

Preferably, in such a case, the device further comprises angular latching means for the disc, advantageously comprising a plot, onto which a blade is to be abutted.

Advantageously, the device comprises an in-height disc-latching plate.

In a preferred embodiment, the platen is removable.

According to an embodiment, the adjustable blade-holding means comprise blade-pinching means.

More preferably, the blade-pinching means comprise screws arranged so as to be abutted under the blade.

Advantageously, the screws then comprise a surface adapted to come into contact with the bulged shape blade.

Still preferably, the blade-pinching means comprise in-height blade-latching means, being integral with a pivoting arm.

Advantageously, the in-height blade-latching means comprise at least one peg connected with the arm through a ball-and-socket link.

Advantageously in such a case, the device comprises at least two pegs, each connected through a ball-and-socket link with a pendulum pivotally mounted at the end of the pivoting arm.

According to an embodiment, the adjustable patch-holding means comprise patch-adjusting means in height and in slope, means for abutting the patch against the blade and in-height patch-latching means.

Preferably, the adjusting means in height and in slope comprise three plots.

Still preferably, the means for abutting the patch against the blade comprise eccentric plots arranged so as to come into contact with the patch edges which are not intended for forming the junction plane.

Still preferably, the in-height patch-latching means comprise a screw supported by a pivoting arm.

According to an embodiment, when the device comprises adjustable heel-holding means, the latter comprise in-height adjusting means and in-height latching means.

Preferably, in such a case, the in-height adjusting means comprise at least one flat nut.

Still preferably still, the in-height latching means comprise at least one pivoting arm.

The present invention will be better understood through the following description of the preferred embodiment of the holding device of the invention, referring to the appended drawings, on which.

The method for repairing a blade will be first described, being the subject of the French application FR 05 08 151, that the holding device according to the invention allows to implement.

Figure 1:
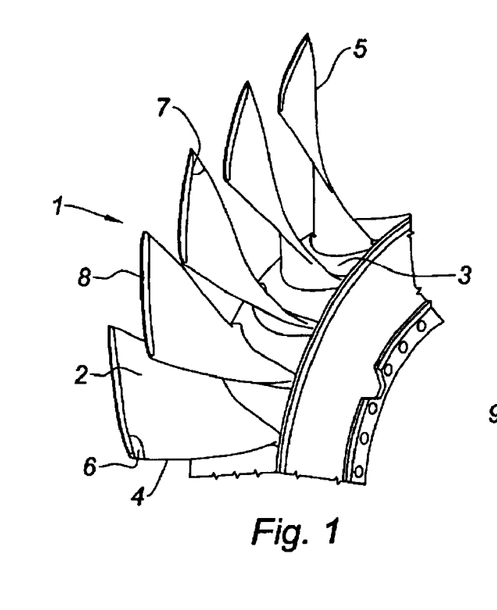
FIG. 1 represents a perspective partial view for a monobloc bladed disc having one blade able to be repaired using the method as implemented by the device according to the invention.

Referring to FIG. 1, such a method relates to repairing a blade 2 extending radially up to the periphery of a rim 3 in a monobloc bladed disc 1 (DAM 1), here made in so-called Ti17 titanium. Because of an impact or wear, such a blade shows a damaged area. The areas likely to be damaged are the leading edges 4, the trailing edges 5, the corners of leading edges 6, the corners of trailing edges 7 as well as the top line of the blade 8, here provided with a lip seal forming tapered portion as is known.

Figure 2:
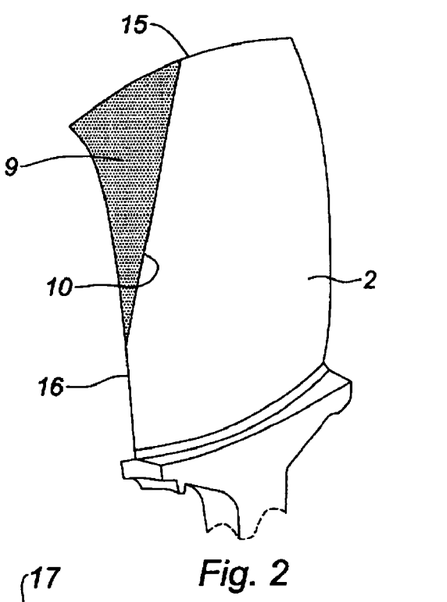
FIG. 2 represents a schematic perspective view of a blade of the disc in FIG. 1, on which has been shown in shaded form the blade portion removed during the setting up stage of the method as implemented with the device according to the invention.

Standardized portions are preliminarily defined on the blade, wherein the damaged areas likely to be repaired could be located, such portions corresponding to blade portions that will be cut in order to be replaced. A first step of the method consists in checking whether the damaged area of the blade is located in such a portion. FIG. 2 shows a blade 2 as well as such a standardized portion 9 represented in shaded form. Such a portion 9 comprises here the corner of the leading edge of the blade 2.

Figure 3:
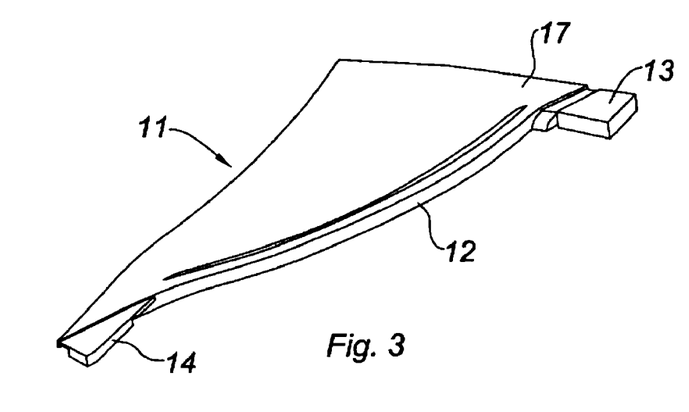
FIG. 3 represents a schematic perspective view of a patch with heels for the method as implemented with the device according to the invention.
Figure 4:
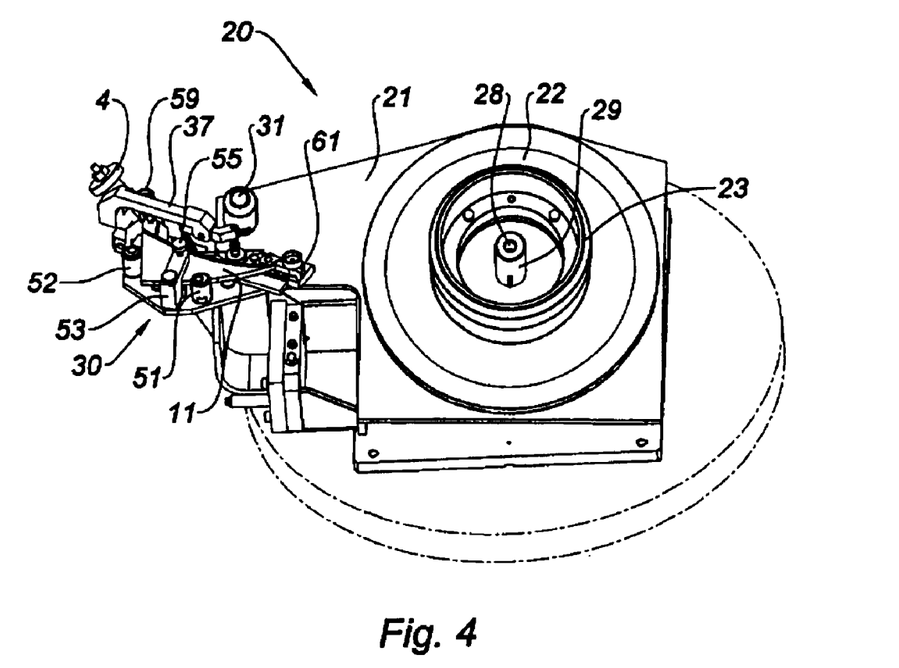
FIG. 4 represents a schematic top perspective view of the holding device of the invention.
Figure 5:
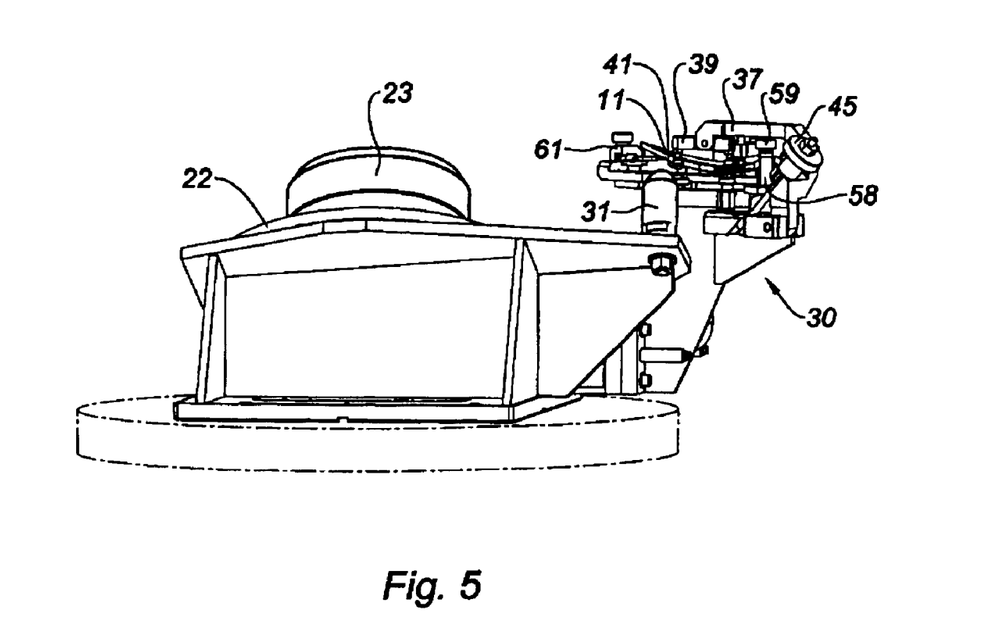
FIG. 5 represents a schematic bottom perspective view, shown from the opposite side compared to FIG. 4, of the holding device of the invention.

If it is the case, the standardized portion is cut through machining. The parameters of such a machining operation are preliminarily accurately defined and are identical for blades of the same type. The cutting line 10 of the standardized portion 9 is defined so as, on the one hand, to progress as slowly as possible for avoiding to have too abrupt inflexion points or corners, in order to facilitate the subsequent cutting and welding operations, on the other hand, to extend in a blade area where the operating stresses are minimum, at least non maximum, so that the area to be welded is not subsequently subjected, along the welding line, to too strong stresses. The maximum dimensions of the cut portion are defined as a function of the use of the motor and taking into consideration the aerodynamic loads the blade 2 is subjected to. Thus, all the defects of a blade 2 housed in such a portion 9, whatever their shape or their nature, can be repaired through cutting such a portion 9 and replacing the latter with a standardized patch 11, as shown in FIG. 3, being described later on. Moreover, the cutting step is carried out so as to ensure a surface state compatible with the desired welding quality.

On the blade 2, there is thus obtained a cutting line having a determined profile. The cutting step here occurs by supporting the disc 1 comprising the blade 2 by means of the holding device of the invention.

Once this cutting step implemented through machining, a cleaning step for the blade 2 and preferably its cutting line 10 is performed, in order to prepare the latter for the welding step.

Before a patch 11 is welded onto the cut blade, a so-called trial start sample is welded, which is not described in details here, the reader being able to refer to patent application FR 05 08 151 for further details.

The patch 11 is then being contacted with the cutting line 10 of the blade 2. Such contact occurs through the holding device of the blade 2 and the patch 11 according to the invention, as will be described later. Such a device should be arranged so as to allow a very accurate positioning of such members one to the other and is adapted to each blade 2. In such a case, as already shown, that is this particular device that has been used for holding the blade 2 upon the cutting operation of its standardized portion 9, allowing to keep the same parameters and to have a welding plane identical to the cutting plane.

The patch 11, being made of the same material as the blade, here Ti17 titanium, has a profile on a cutting line 12 exactly reproducing the defined profile of the cutting line of the blade 2, and presents an over-thickness compared to the thickness of the blade 2, here substantially equal to 1 mm, approximately distributed for 0.5 mm on one side of the blade and 0.5 mm on the other side, for a blade having its thickness varying between 0.7 and 3.45 mm. The thickness of the patch 11 therefore runs, on its cutting line 12 but also throughout its whole surface, along its cutting line 10 and on the surface corresponding to the portion that has been removed, with an over-thickness. In other words, the shape of the patch 11 in surface overall corresponds to that of the portion 9 of the blade 2 that has been cut, the dimensions thereof being slightly larger.

In the extension of each end of its cutting line 12, the patch 11 comprises a heel 13, 14 projecting from the surface of the cutting line 12 and extending so that it does not interfere with the blade 2 once the patch 11 has been brought in contact with it. More specifically, each heel 13, 14 matches the shape of the ridge 15, 16 of the blade 2 extending from its cutting line 10, in the present case, the ridges corresponding to its top line 15 and its leading edge 16, that formed the corner of the leading edge of the blade 2. Such heels 13, 14 allow to initialize and to end the welding step, as will be seen later. The heels 13, 14 could be either formed integrally with the patch 11, or be fixed on it. In the case where they are formed integrally with it, they also allow an operator to keep and move the patch 11. The heels 13, 14 are, in the present case, independent of the patch 11 and brought in contact with the blade 2.

The cutting line 12 of the patch 11 is thus brought into contact with the cutting line 10 of the blade 2; such a contact must be performed in a very accurate way, using the holding device of the invention, insofar as the profile of the patch 11 exactly matches the profile of the blade 2, which was not the case in the prior art where the patches had a constant thickness significantly higher than the maximum thickness of the blade. Due to such an evolutional thickness of the patch 11, too large differences are omitted as well as thickness variations between the blade 2 and the patch 11, simplifying the subsequent electron-beam welding method and ensuring a better quality of it, such a method precisely requiring a high implementing accuracy. This allows to limit the causes resulting in welding defects, such as, for example, blowholes. The holding device according to the invention, maintaining the blade 2, the patch 11 and the heels 13, 14 which are here not integrally formed with the patch 11, should thus allow such a three-dimension positioning.

The electron-beam welding is then performed through an electron-beam welding machine. To this end, the holding device for the blade 2, the patch 11 and the heels 13, 14 is put with them in a neutral atmosphere, typically under vacuum, an electron gun of the machine emitting an electron beam onto the welding seam, located at the interface between the cutting lines 10, 12 of the blade 2 and the patch 11, the kinetic energy of the electrons heating the parts and allowing their welding. The various parameters of such a welding step, including the beam power (typically ranging from 5 à to 200 kV), the electron rate, set using acceleration tensions, the electron density, the focussing stream allowing to set the depth of the focussing point, the amplitude, the vibration shape and frequency for the electron beam about its axis and the beam-moving rate have been preliminarily defined through trials on development samples similar to the so-called trial start sample referred hereinabove.

Performing an electron-beam welding operation has several advantages, i.e. the welding rate and the welding quality obtained along a relatively thin welding seam.

Welding is initiated on a heel 13. Indeed, in the electron-beam welding, the welding start generates defects in the part, as well as a hole. Such disadvantages do not affect the blade 2 insofar as they are confined in the heel 13. Further, the initiation on the heel 13 allows, when the electron beam reaches the junction plane between the blade 2 and the patch 11, for the electron gun to be at its full power, a power that it keeps until the end of the cutting line 10 of the blade 2. The whole step of welding the patch 11 to the blade 2 thus occurs, as far as the cutting line 10 of the blade 2 is concerned, in a "permanent mode" of the electron gun. It is to be noted that in this particular case, the welding seam is of the keyhole type. The welding step goes on and ends on the opposite heel 14, so that the defects and the hole, also created during this stage, should be confined in this heel 14.

The electron beam is not directed exactly on the junction plane but slightly offset on the side of the patch 11. Indeed, around a welding seam, a "channel" could appear, i.e. an area with its thickness being reduced relative to its initial thickness, because of some material leaking towards the welding seam. As the patch 11 has a higher thickness than the blade 2, the material has a tendency to bypass the welding seam so as to fill up the channel on the side of the blade 2. The channel that could be formed on the side of the patch 11 would disappear in the subsequent machining step. Thus, the offset of the beam on the side of the patch 11 allows for the presence of a channel to be avoided in the repaired blade 2.

The parameters of the electron-beam welding machine electron beam are preferably tuned up using means allowing for such parameters to be controlled by the geometry of the welding seam, thus, by the geometry of the cutting line 10 of the blade 2, in an evolutional way, in real time, along such a cutting line 10. The resulting welding seam is therefore of a better quality.

Another advantage of using heels 13, 14 is also noteworthy. The blade 2 comprises, along its top line 15, a lip seal, to which a lip 17 corresponds on the patch 11. Because of its very small thickness, such a lip cannot be directly welded by electron beam, as this area would collapse upon welding. It was thus frequent, in the prior art, not to weld the lip but to form one subsequently, through a reloading method, by laser, for example, leading to considerable over-expenditure. The heel 13, put under on the lip, on the side of the blade 2 and of the patch 11, where the profile extension is wider, forms an over-thickness at the level of the lip. Thus, the welding area of the lip portions therebetween is not too thin and such portions could be welded through electron-beam welding, in order to ensure the continuity of the lip of the blade 2 once repaired.

Once the electron-beam welding operation has been completed, the blade 2 together with the patch 11 being welded, is subjected to a thermal treatment in order to decrease the stresses generated upon welding. An ultrasound shot-blasting operation could also be implemented. Some checkings are then performed, in order to check the welding quality. Such checkings could be limited to visually inspecting whether the welding has indeed be implemented and that it has not, as far as can be seen, produced visible defects, because of the guarantees provided by welding a trial start sample. To this end, it could be tried to visually detect oxidation marks that could be created due to a bad protection by the confinement gas, linking lacks, pits (using a binocular device) and unmelted parts.

Should the result be, further to such brief checking(s), satisfactory, the patch 11 is then machined so as to remove the excess material in order to get an almost final shape practically corresponding to the complete shape for the blade 2. Several passes of such a tool are implemented, little material being removed each time, until a blade results the dimensions of which are slightly higher than the final dimensions, i.e. with the dimensions corresponding to the initial blade dimensions. These are the dimensions of the portion 9 that has been cut and replaced by the patch 11, the remainder of the blade 2 being not machined as it should remain identical to the remainder of the initial blade 2.

Repairing the blade 2 is tuned and completed through manual polishing, in order to obtain a blade 2 identical to the initial blade 2.

The method is inter alia characterized in that, before welding the patch 11 to the blade 2, a so-called trial start sample is welded, allowing, before the welding operation on the blade 2, for the parameters of the electron-beam welding machine to be checked. A so-called trial end sample could also be welded, in order to check, after the welding operation on the blade 2, the parameters of the machine. As precised hereinabove, such aspects of the method will not be further detailed.

The part-holding device upon the welding operation will now be described referring to FIGS. 4 to 12.

As shown on FIGS. 4, 5, 6, 9, 10 and 11, the holding device 20 is represented, for reasons of figure readability, without a monobloc bladed disc (DAM) 1, but only with a patch 11 and heels 13, 14. On FIGS. 7 and 12, the holding device is represented with a DAM 1.

The device 20 comprises a base 21 for supporting a plate 22 as a support for a monobloc bladed disc (DAM) 1. The base 21 and the plate 22 are stationary. The plate 22 supports a mandrel 23 for centring and holding the DAM 1. Such a mandrel 23 is hollow.

Figure 7:
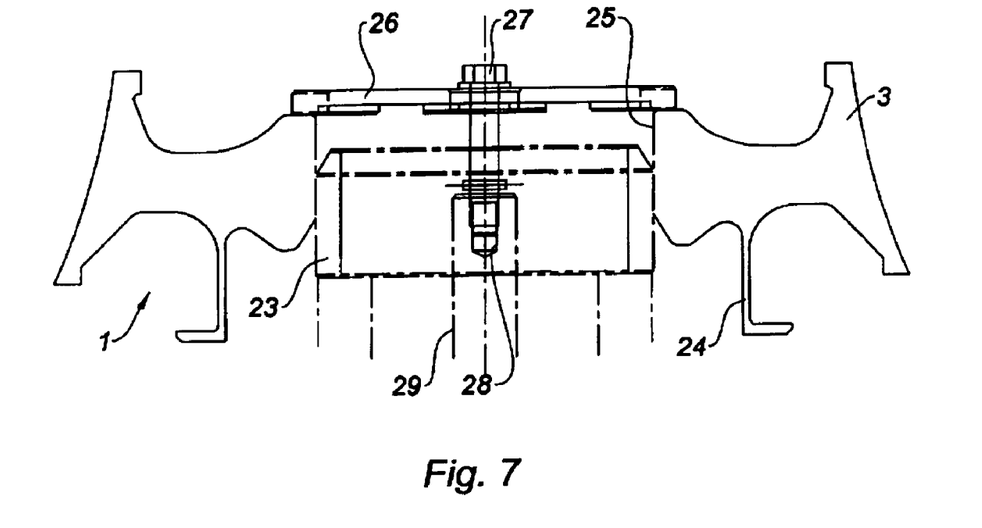
FIG. 7 represents a partial sectional view of a monobloc bladed disc mounted on the holding device according to the invention.

In FIG. 7, the DAM 1 is represented without the blades 2, for simplification reasons of drawings, but does indeed comprise blades 2 being integral with its rim 3, as it is a DAM 1, i.e. a disc with all the members formed integrally. The DAM 1 comprises a recessed central part 25. The DAM 1 is fitted around a mandrel 23 through its recessed central part 25. The DAM 1 comprises a cylindrical flange 24 with its axis being parallel to the axis of the mandrel 23 and extending downward when the DAM 1 is being fitted onto the mandrel 23; this is the flange onto which a labyrinth joint is secured. The platen 22 is shaped so that its flange 24 abuts on the platen 22 when the DAM 1 is fitted onto the mandrel 23, allowing for the DAM 1 to be latched in height.

Figure 12:
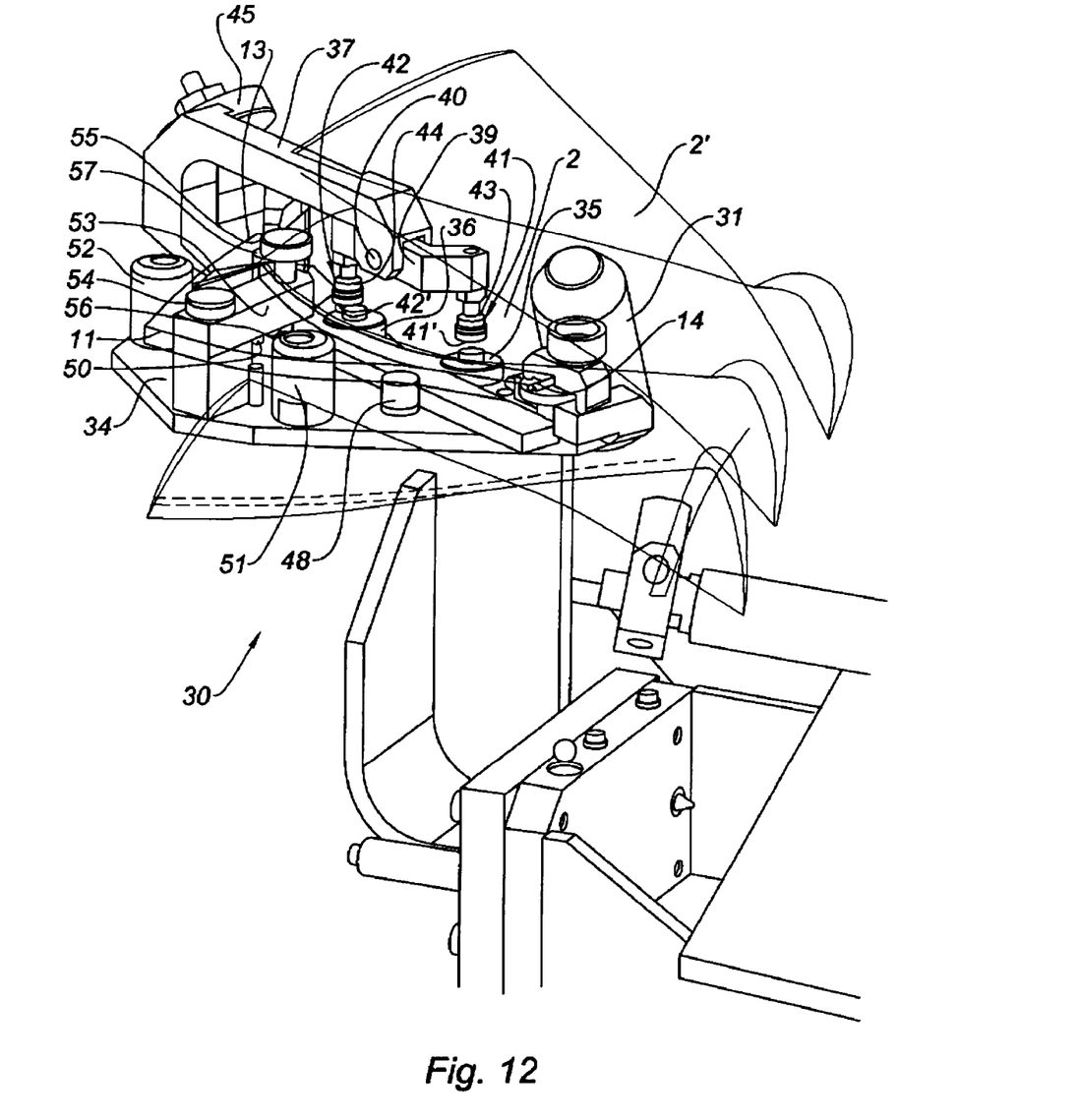
FIG. 12 represents a schematic view, in perspective and in wireframed representation, of the platen of the holding device according to the invention with a monobloc bladed disc positioned on the device.

The DAM 1 is angularly latched by means of an angular latching plot 31, fixed onto the base 21. A blade of the DAM 1 abuts on such a plot 31, here along a portion of its leading edge, latching the DAM 1 in rotation in the direction of the plot 31 and more specifically allows to determine the angular position of the DAM 1 and, thus, of the blade 2 to be repaired. In such a case, as is shown in FIG. 12, this is a blade 2' adjacent to the blade 2 to be repaired that abuts on the plot 31.

Figure 8:
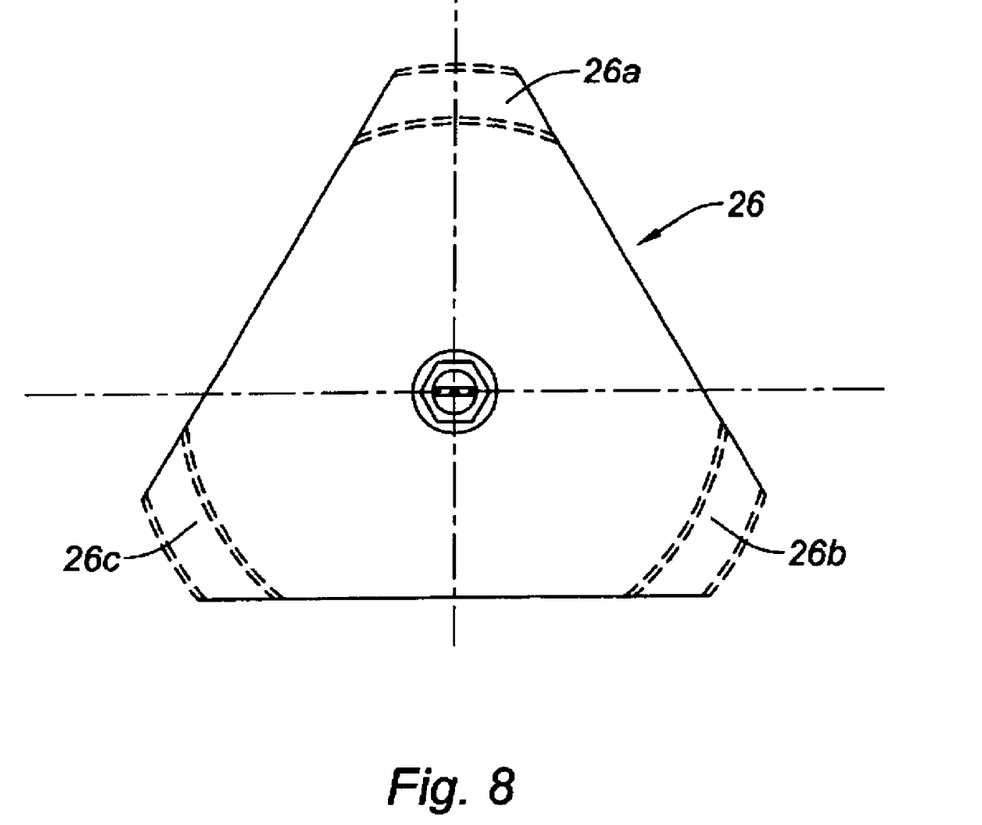
FIG. 8 represents a schematic top view of the plate for latching a monobloc bladed disc on the holding device of the invention.
Figure 9:
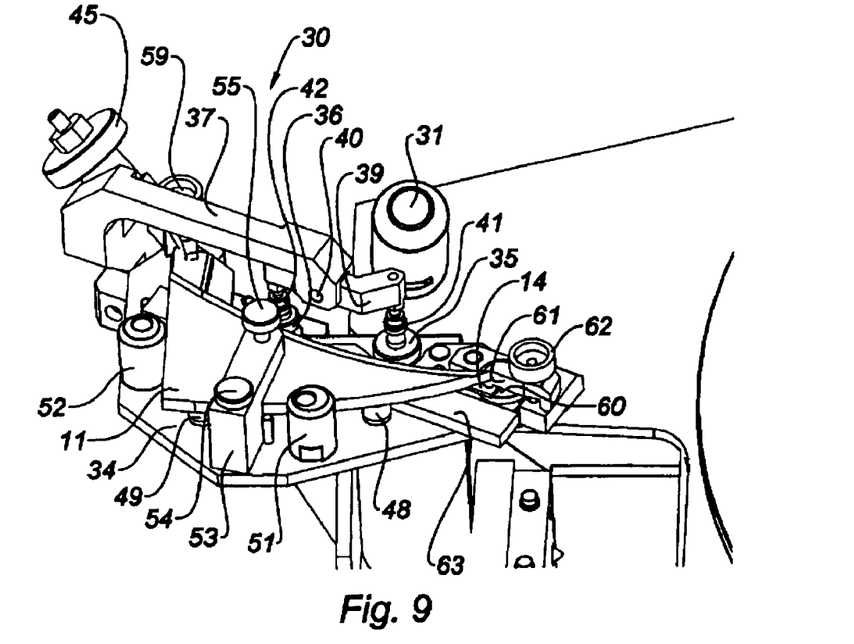
FIG. 9 represents a schematic top perspective view of the holding platen for a blade and a patch of the holding device according to the invention.

The DAM 1 is latched in position on the mandrel 23 by means of a holding plate 26, playing as an in-height latching function, i.e. forming some sort of a lid, represented in top view in FIG. 8. Such a holding plate 26 is of an overall triangular shape and its three end portions 26a, 26b, 26c abut on the periphery of the recessed central part 25 of the DAM 1. The holding plate 26 is secured in position by a screw 27 being screwed into a bore 28 formed in a column 29 projecting in the recessed central part of the mandrel 23.

The holding device 20 also comprises a platen 30 for positioning and holding a blade 2, a patch 11 and, the case being, heels 13, 14. Such a platen 30 is here removable relative to the holding device 20. It is fixed to the base 21 by means of a plurality of screws 23 and optionally of centring plots or bores 33 in cooperation with the base 21, once the DAM 1 is in position.

The platen 30 comprises a plane 34 for supporting the various elements involved in positioning and holding the blade 2, the patch 11 and the heels 13, 14. Such a plane 34 is preferably substantially horizontal.

Once the DAM 1 has been positioned and latched as described hereinabove, the platen 30 is secured onto the base 21. According to another embodiment, the platen 30 is already fixed onto the base 21 when the DAM 1 is put in position. It is preferred, according to the invention, that the platen 30, being removable, be only fixed onto the base 21 once the DAM 1 is positioned, for simplification reasons linked to an overload.

The blade 2 to be repaired is then latched in position. To this end, the supporting plane 34 supports two screws 35, 36 arranged so as to abut under the blade 2; they are adjustable in height manually; so that the blade 2 lies on them. Their end, arranged so as to come into contact with the blade 2, has a bulged shape, allowing a homogeneous contact whatever the position of the blade 2.

Figure 10:
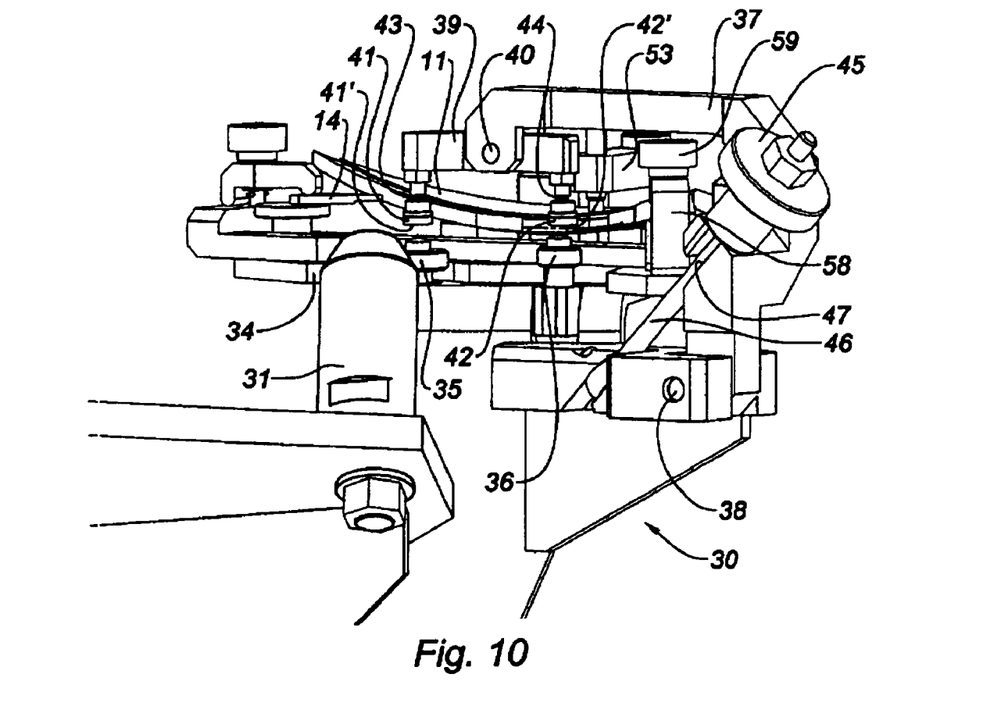
FIG. 10 represents a schematic side perspective view, shown from the opposite side compared to FIG. 9, of the platen of the holding device of the invention.
Figure 11:
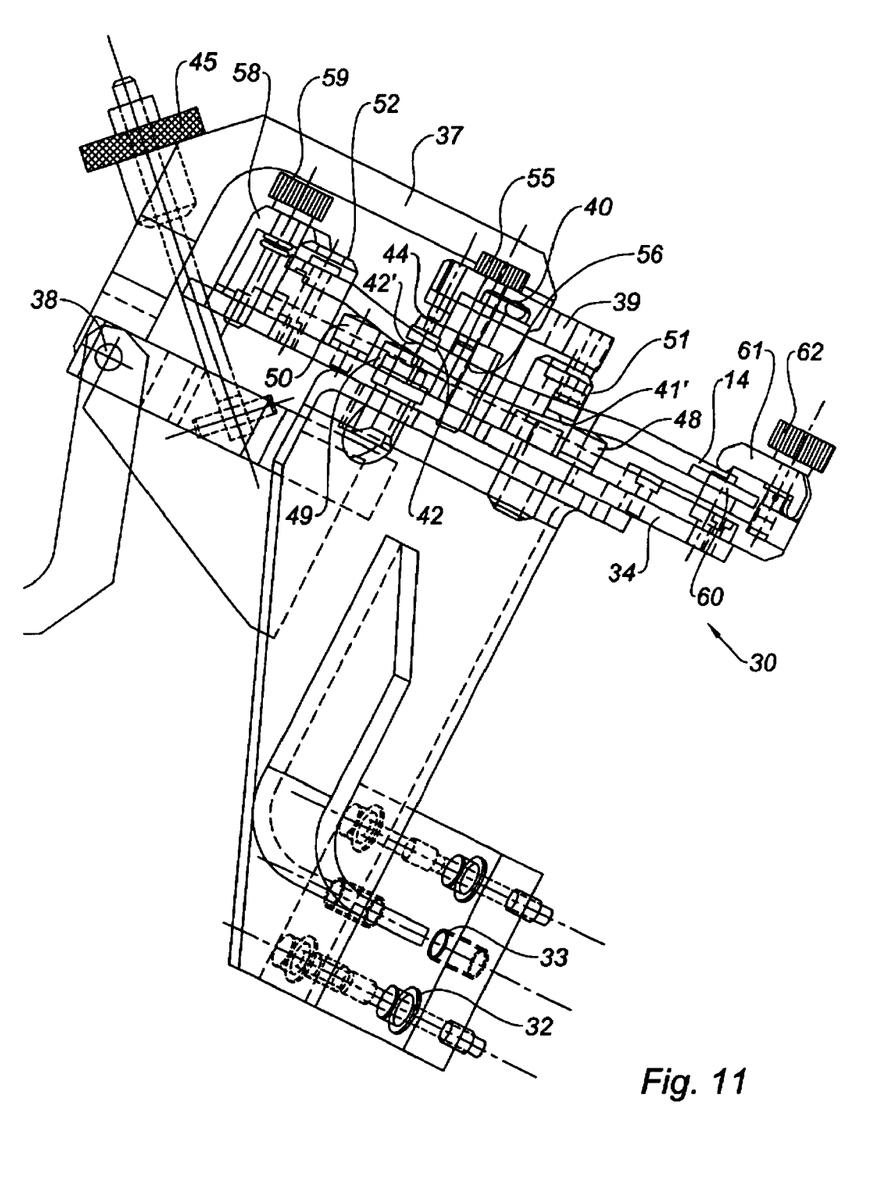
FIG. 11 represents a schematic sectional view of the platen of the holding device according to the invention.

Referring in particular to FIG. 10, a pivoting arm 37 is mounted at the end of the supporting plane 34, on the external side relative to the centre of the DAM 1. The arm 37 is of a bent shape, i.e. it has a L-shaped profile section. Such an arm 37 is connected with the supporting plane 34 by one of its ends, at the level of an axis 38. Such an arm 37 is initially in spaced position from the blade 2. When the blade 2 is abutting on the screws 35, 36, the arm 37 is folded back toward the blade 2 through rotation about the axis 38, around which it rotates. Such a rotating axis 38 is substantially parallel to the supporting plane 34 of the platen 30, which is here substantially parallel to the horizontal. The arm 37 supports, at its other end, a pendulum-forming pivoting arm 39. The pendulum 39 rotates around an axis 40 parallel to the rotating axis 38 of the pivoting arm 37. It supports, at each of its ends, a peg 41, 42, the end of which comprises a planar surface 41', 42' contacting the blade 2. Each peg 41, 42 is connected with the pendulum through a ball-and-socket link 43, 44 respectively. Thus, through combining the pivoting action of the pendulum 39 and of the pegs 41, 42 linked to the latter through the ball-and-socket link 43, 44, the contacting surfaces 41', 42' of the pegs 41, 42 are pressed against the blade 2, whatever the position of the latter, and thereby maintain it in position.

The blade 2 is thereby pinched between the bulged screws 35, 36 and the pegs 41, 42, arranged so as to locate substantially opposite on both sides of the blade 2.

When the blade 2 is thereby latched, the pivoting arm 37 is maintained in position through screwing a screw 45 for latching the arm 37. Such a screw 45 comprises a stem 46 arranged so as to be housed in a groove 47 of the arm 37 and thereby secure it in position, as is shown in FIG. 10.

It should be noted that the blade 2 is latched but not actually clamped. Indeed, what matters in an electron-beam welding operation is the relative position of the members to be welded; such positions should remain stable throughout the welding operation. As the latter does not involve very important stresses on the parts, the latter do not need to be maintained with an important clamping force. A slight clamping force is enough, but it should be accurate and constant.

Thus, the screws 35, 36 and the pivoting arm 37 form means for holding the blade 2. They also form, in some extent, means for adjusting the positioning of the blade 2, the latter being however primarily (or even completely) achieved by means for positioning the DAM 1 (i.e. the supporting mandrel 23 and the plate 22, the in-height latching plate 26 and the angular latching plot 31).

Holding the blade 2 is necessary as, upon the welding operation, the thermal stresses induced on the blade 2 do not indeed require an important clamping, as has been shown hereinabove, but would involve a removal of the blade 2 in the absence of any holding means. The means 35, 36, 37 for holding the blade 2 are therefore necessary members.

Once the blade 2 is latched, the patch 11 is added, positioned and maintained in such a position.

The plane 34 for supporting the platen 30 supports three plots 48, 49, 50 for adjusting the height and the slope of the patch 11. Such plots 48, 49, 50 are distributed as a triangle, so as to support the patch 11 in the vicinity of each of the corners thereof. The plots 48, 49, 50 are adjustable in height manually, in order to position exactly the patch 11 relative to the blade 2, i.e. so as to position the cutting plane 12 of the patch opposite the cutting plane 10 of the blade 2 in order to form the most accurate junction plane as possible. An accuracy of a tenth of millimetre is required for such a junction plane. Such positioning of the patch 11 relative to the blade 2 could be carried out visually.

The platen 30 supports two plots 51, 52 each hinged around an eccentric position. Each plot 51, 52 has the form of a cylinder, comprising an off-axis bore through which the plot 51, 52 is inserted into a fixed stem 51', 52', respectively, integral with the supporting plane 34. Each plot 51, 52 is mounted rotationally around said stem 51', 52'. Once the patch 11 is adjusted in height and in slope by the plots 48, 49, 50, both plots 51, 52 being hinged about an eccentric, which had been previously spaced apart from the patch 11, are abutting on both edges of the patch 11 that are not supposed to form the junction plane. The patch 11 is thereby pushed in the blade 2 direction and is maintained in contact with the latter. Such plots 51, 52 thus form means for abutting the patch 11 against the blade 2. The plots 51, 52 hinged around an eccentric could be latched in position, for example, through a latching system using a screw or a nut, as is known.

The platen 30 furthermore supports a rotating arm 53. Such an arm 53 is angled shaped, i.e. it has a L shaped profile section. It is arranged in a position out of contact with the patch 11, outside the platen 30. Once the patch 11 is appropriately positioned with respect to the blade 2, that is latched by the plots 48, 49, 50 and the plots 51, 52 hinged around an eccentric axis, the arm 53 is rotated in the direction of the patch 11, through rotation around an axis crossing a bar of the L shape formed by the arm 53. Such an axis 54 is substantially perpendicular to the plane 34 of the platen 30, that is here substantially vertical. The other bar of the L shape formed by the arm 53 supports, at its free end, a screw 55 for latching the patch 11 in height. Such a screw 55 extends perpendicularly to the arm portion 53 supporting it, that is here, substantially vertically. It could be screwed manually n order to abut against the patch 11, approximately in the centre of the surface of the latter. The surface 56 of the screw 55 intended to abut on the patch 11 has a bulged shape, so that the contact will be always identical, whatever the slope of the patch 11 with respect to the screw 55. The patch 11 is thereby correctly held in position.

Just like the blade 2, the patch 11 is more latched than really clamped, as what matters is that it should be perfectly positioned and held, which does not require an important clamping force insofar as the stresses induced by welding are not very high.

Heels 13, 14 are also latched and held in position. It should be noted in FIG. 3 that, in such a case, the patch 11 is completed by a trapezoid shaped heel 13 and a triangle shaped heel 14. The heels 13, 14 are here applied onto the patch and not integrally formed with it. They are manually adjusted by filing and polishing, in order to perfectly match the complex shapes to which they are to be integrated.

The trapezoid shaped heel 13 is adjusted in height by a flat nut 57 onto which it is placed, in the vicinity of the pivoting arm 37. Such a nut 57 is manually screwed or unscrewed in order to adjust the height of the heel 13. The heel 13 is latched by means of a small pivoting arm 58. This small pivoting arm 58 is L-shaped, that is with an L-shaped profile section, with a bar thereof substantially parallel to the supporting plane 34—i.e. here a horizontal bar—and a bar substantially parallel to that plane 34—i.e. a vertical bar. The stem of a vertical screw 59 crosses the horizontal bar. The arm 58 rotates about such a screw 59. The horizontal bar comprises, at its free end, a surface being in contact with the heel 13; the contacting surface is more precisely located at the end of a projecting prominence at the free end of the small arm 58 (such a prominence being parallel to the arm portion corresponding to the vertical bar of the L-shape formed by its profile section). Thus, the small pivoting arm 58 is used for latching the heel 13, the arm 58 being equilibrated between its contact surface with the heel 13 and the free end of its portion corresponding to the vertical bar of the L-shape formed by its profile section, in contact with the supporting plane 34, the whole assembly being maintained through screwing the screw 59. The heel 13 is thereby pinched between the flat nut 57 and the small pivoting arm 58, which is enough for maintaining it considering the stresses involved by welding. The heel 13 is furthermore fitted very accurately manually through filing and polishing; therefore only its adjustment in height is required for a good positioning.

The triangle shaped heel 14 is maintained similarly between a flat nut 60, being adjustable in height, and a small pivoting arm 61. Similarly as previously, the small pivoting arm 61 pivots about a screw 62 and allows for the heel 14 to be latched. Such members are supported by the supporting plane 34. It should be noticed in figures that the heel 14 is not aligned with the patch 11.

Figure 6:
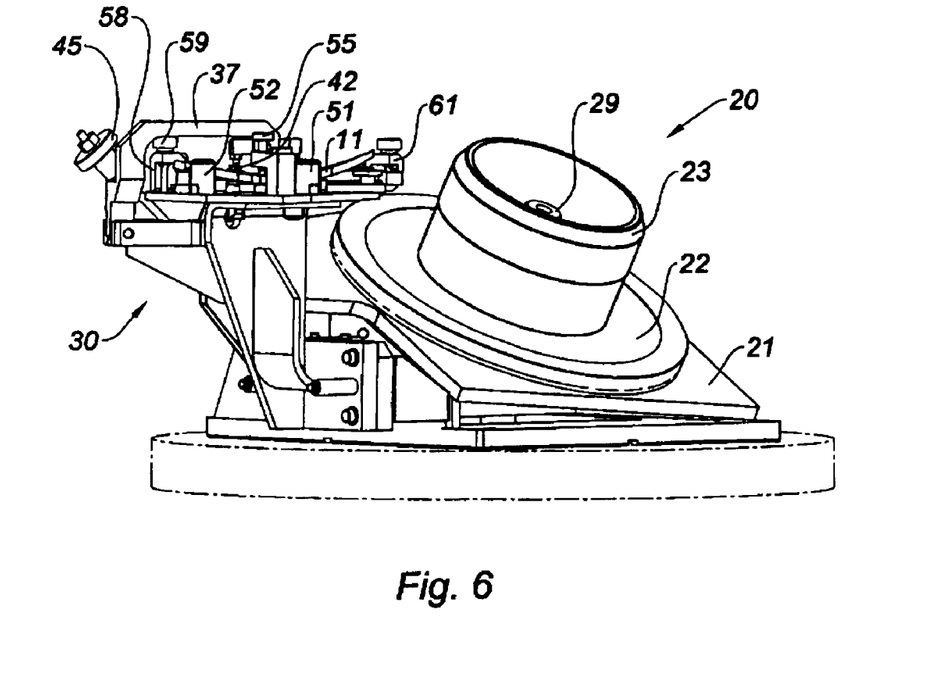
FIG. 6 represents a schematic perspective side view of the holding device of the invention.

Thus, by means of the holding device 20 according to the invention, the DAM 1 is maintained by the mandrel 23 and the lid 26, angularly latched by means of a latching peg 31. Referring to FIG. 6, the base 21, the platen 22 and the mandrel 23 are tilted such that, because the blades 2 are tilted relative to the rim 3 of the DAM 1, the blade 2 to be repaired extends substantially tangentially to a horizontal plane, at least in the area to be repaired.

The blade 2 is maintained in position through pinching, by means of screws 35, 36 cooperating with pegs 41, 42 of the pivoting arm 37. Furthermore, the patch 11 could be adjusted according to the three dimensions relative to the blade 2, by means of the various adjustable holding means, including the height and tilting adjustment plots 48, 49, 50, the plots 51, 52 hinged about an eccentric, for abutting against the blade 2, and the screw 55 for latching the patch 11 in height, supported by the rotating arm 53.

Furthermore, the case being, the heels 13, 14 are easily held through pinching between a flat nut 57, 60 and a small pivoting arm 58, 61, respectively. Moreover, they are perfectly adjusted through manual filing and polishing.

Once the assembly is thus held, the holding device 20, the DAM 1, the patch 11 and the heels 13, 14 are introduced into the enclosure comprising the electron-beam welding machine and this latter operation is performed. It is shown, in FIG. 9, for example, the presence of a fire-wall plate 63, positioned under the junction plane in order to avoid damaging the supporting plane 34 during the welding step.

Preferably, all the members of the holding device 20 are made of a-magnetic materials, so as not to deflect the electron beam upon welding. Such materials include for example brass, titanium or inox.

This invention has been presented referring to repairing a blade 2 of a full DAM 1. In some applications, including for trials, only one quarter of the DAM or half a DAM is available. The holding device 20 of this invention applies to any DAM portion; it is only necessary, to this end, to adapt the latching means of the DAM 1 in position on the mandrel 23, i.e. here, to adapt the lid 26, giving it a shape adapted to the DAM portion to be held. Other holding members of the DAM portion could be added. The holding device assembly 20 remains furthermore identical to that which has been presented.

Furthermore, and as could be seen hereinabove, the holding device 20 could be used both for machining the standardized portion 9 of the blade 2 as well as for welding the patch 11.

It should finally to be noticed that the various members for holding the blade 2, the patch 11 and the heels 13, 14 are arranged such that such members are held one against the other but that the space above the junction plane between the blade 2 and the patch 11, as well as its extension at the level of the heels 13, 14, should be free, so that an electron beam could pass therethrough. Preferably, the space under the junction plane should remain free, a firewall plate 63 being advantageously slid into this space. Thus, on the supporting plane 34, the means for holding the blade 2—i.e. the screws 35, 36 and the pivoting arm 37—, the means for holding the patch 11—i.e. the plots 48, 49, 50, the eccentric plots 51, 52 and the rotating arm 53—, as well as the means for holding the heels 13, 14—i.e. the flat nuts 57, 60 and the small pivoting arms 58, 61—are all arranged such that these members are only located under or on the parts that are intended to be held, without extending through the junction plane between the blade 2 and the patch 11.

The present invention has been disclosed with a triangle shaped patch, arranged for repairing a standardized portion comprising the corner of the leading edge of the blade. It should be understood that this invention applies to any patch type, whatever the blade area it is intended to replace and whatever its shape. Each holding device is thus specifically adapted to a particular DAM, as well as to a determined patch type. It could be contemplated having available a plurality of platens—each adapted to a particular patch type—able to be fixed onto the device depending on the blade portion to be repaired.

The invention claimed is:

1. A part-holding device in a method for repairing a blade of a monobloc bladed disc in a turbo-machine, through electron-beam welding of a patch onto the blade along a junction plane, the device comprising:
    a disc supporting device which supports the disc; and
    an adjustable holding device which holds both the blade and the patch horizontally, the adjustable holding device comprising a platen which supports the adjustable holding device arranged so that a space located above the junction plane allows for an electron beam to pass,
    wherein the platen includes a supporting plane which supports the adjustable holding device,
    wherein the adjustable holding device includes a blade pinching device which pinches the blade, a patch adjusting device which adjusts height and slope of the patch, a patch abutting device which abuts the patch against the blade, and a patch latching device which latches the patch in height,
    wherein the blade pinching device includes first and second blade supporting screws and first and second pegs, the first and second blade supporting screws are provided on the supporting plane and abut under the blade, and the first and second pegs press against the blade from above and are disposed on a pivoting arm connected to the platen,
    wherein the patch adjusting device includes first, second and third plots provided on the supporting plane which hold the patch from below and adjust the height and slope of the patch, the first, second and third plots are distributed as a triangle so as to support the patch in a vicinity of each corner thereof, the first, second and third plots are adjustable in height,
    wherein the patch adjusting device includes fourth and fifth plots which are rotationally mounted on the supporting plane and abut edges of the patch that do not form the junction plane such that the patch is pushed towards the blade and is maintained in contact with the blade, the fourth and fifth plots each includes an off-axis bore through which a fixed stem integral with the supporting plane is inserted, and
    wherein the patch latching device includes a latching screw which abuts the patch from above, the latching screw is supported by a rotating arm disposed on the supporting plane.

2. A device according to claim 1, further comprising an adjustable heels holding device which holds heels disposed on the patch.

3. A device according to claim 1, wherein the adjustable holding device is manually adjustable.

4. A device according to claim 1, wherein the disc supporting device includes a mandrel to which the disc is secured.

5. A device according to claim 1, wherein the platen is removable.

6. A device according to claim 1, wherein the first and second blade supporting screws include a bulged shaped surface which comes into contact with the blade.

7. A device according to claim 1, wherein the first and second pegs are attached to the pivoting arm through a ball-and-socket link.

8. A device according to claim 1, wherein the supporting plane which supports the adjustable holding device is substantially horizontal.

9. A device according to claim 2, wherein the adjustable heels holding device includes an in-height adjusting device and an in-height latching device.

10. A device according to claim 4, further comprising an angularly latching device which angularly latches the disc.

11. A device according to claim 4, further comprising a plate which latches in height the disc.

12. A device according to claim 7, wherein the first and second pegs, are linked through the ball-and-socket link to a pendulum pivotally mounted at the end of the pivoting arm.

13. A device according to claim 9, wherein the in-height adjusting device includes at least one flat nut.

14. A device according to claim 9, wherein the in-height latching device includes at least one pivoting arm.

15. A device according to claim 10, wherein the angularly latching device includes a blade abutting plot which abuts the blade.

* * * * *